United States Patent [19]

Kai

[11] Patent Number: 5,724,124
[45] Date of Patent: Mar. 3, 1998

[54] LASER RADAR APPARATUS

[75] Inventor: Koichi Kai, Tokyo, Japan

[73] Assignee: Mitsubishi Denki Kabushiki Kaisha, Tokyo, Japan

[21] Appl. No.: 634,613

[22] Filed: Apr. 19, 1996

[30] Foreign Application Priority Data

Oct. 13, 1995 [JP] Japan ................... 7-265746

[51] Int. Cl.$^6$ ................... G01S 17/08
[52] U.S. Cl. ................... 356/5.01; 340/825.34
[58] Field of Search ................... 356/5.01; 340/825.31, 340/825.34, 435, 557, 903

[56] References Cited

U.S. PATENT DOCUMENTS

| 5,202,742 | 4/1993 | Frank et al. | 356/5 |
| 5,229,648 | 7/1993 | Sues et al. | 340/825.31 |
| 5,266,955 | 11/1993 | Izumi et al. | 342/70 |
| 5,506,584 | 4/1996 | Boles | 340/825.34 |
| 5,627,511 | 5/1997 | Tagaki et al. | 340/557 |

FOREIGN PATENT DOCUMENTS 7134178   5/1995   Japan.

*Primary Examiner*—Ronald L. Biegel
*Attorney, Agent, or Firm*—Sughrue, Mion, Zinn, Macpeak & Seas, PLLC

[57] ABSTRACT

Disclosed herein is a laser radar apparatus comprising a laser radar head section for measuring a distance to an object of detection, based on the time until laser light irradiated to the object of detection is reflected by the object of detection and returns, and a laser radar control section for performing laser irradiation control of the laser radar head section and also performing various kinds of calculation processes, based on the result of the distance measurement. The laser radar head section is provided with an identification function of identifying that the laser radar control section being connected is a regular laser radar control section.

16 Claims, 15 Drawing Sheets

FIGURE 9 (a)

IDENTIFICATION CODE TRANSMISSION

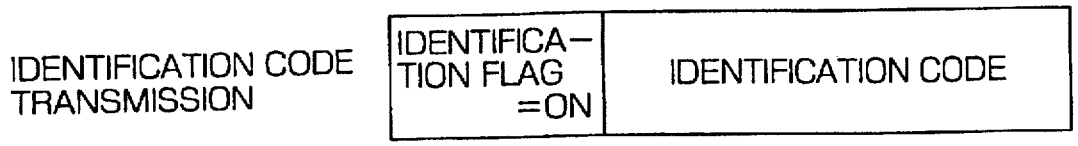

FIGURE 9 (b)

DISTANCE MEASUREMENT DATA TRANSMISSION

TRANSMISSION DATA STRUCTURE : FROM A LASER RADAR HEAD SECTION 7 TO A LASER RADAR CONTROL SECTION 8

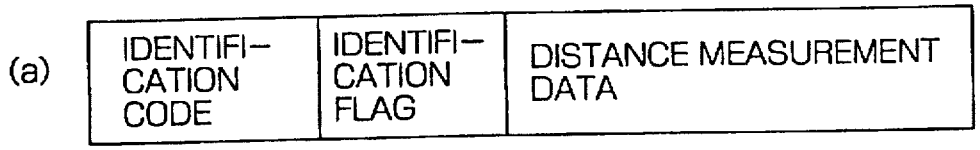

TRANSMISSION DATA STRUCTURE : FROM A LASER RADAR HEAD SECTION 7 HAVING A DATA FRAME FOR IDENTIFICATION CODE TO A LASER RADAR CONTROL SECTION 8

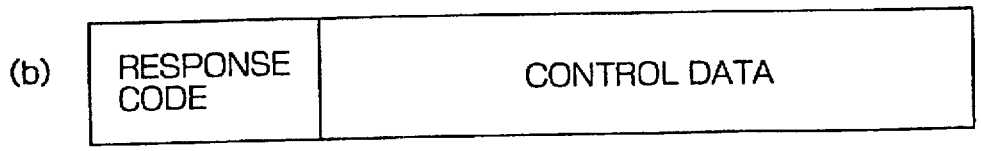

TRANSMISSION DATA STRUCTURE : FROM A LASER RADAR HEAD SECTION 7 TO A LASER RADAR CONTROL SECTION 8

| IDENTIFICATION CODE | 1 | 2 | 3 | 4 | 5 | 6 | 7 | 8 | 9 | 10 |
|---|---|---|---|---|---|---|---|---|---|---|
| RESPONSE CODE | 3 | 10 | 4 | 8 | 2 | 1 | 6 | 9 | 5 | 7 |

LASER RADAR APPARATUS

BACKGROUND OF THE INVENTION

1. Field of the Invention

The present invention relates to a laser radar apparatus equipped with a function of preventing an illegal use of laser light for distance measurement.

2. Description of the Related Art

A radar apparatus using laser light has hitherto been employed in an inter-vehicle distance measuring apparatus, and this apparatus is provided with an inter-vehicle distance alarm apparatus which will give an alarm if an inter-vehicle distance becomes less than a certain value. FIG. 17 is a block diagram showing an inter-vehicle distance alarm apparatus which is part of an inter-vehicle distance measuring apparatus well known to the inventor. In this inter-vehicle distance alarm apparatus, a laser radar head section 1 measures a distance between a driver's own vehicle (hereinafter referred to as a self-vehicle) and a preceding vehicle, based on the time until the laser light irradiated toward the preceding vehicle ahead of the self-vehicle is received as the reflected light, and outputs the distance measurement data.

A laser radar control section 2, to which the distance measurement data is input, judges whether it outputs an inter-vehicle distance alarm signal, from a control signal 3S that is output from a stop light switch 3 indicating the application of a brake, or from an output signal 4S of a sensor section 4 comprising a vehicle speed sensor and a steering angle sensor. A display device 5 displays various kinds of data obtained at the time of the inter-vehicle distance measurement and urges a driver to do safety driving.

The laser radar control section 2, if judging from the control signal 3S of the stop light switch 3 and the output signal 4S of the sensor section 4 that the inter-vehicle distance has become less than a certain value, will cause a speaker 6 to generate an alarm sound. However, when the brake is being applied or in a case where the steering wheel is turned in a predetermined direction to get ahead of a forward vehicle with the inter-vehicle distance thereto being shortened, the inter-vehicle distance alarm signal is not output although the inter-vehicle distance has been excessively reduced.

At this time, only in a case where the inter-vehicle distance alarm apparatus operates normally and also where it is judged that a vehicle is traveling far ahead, the laser radar control section 2 outputs control data to the laser radar head section 1 so that the laser light intensity is controlled to allow the irradiation of the laser light with an intensity of class 1 or higher to be described later. Therefore, when the inter-vehicle distance is short or less than a prescribed value, laser light of weak intensity not greater than class 1 is generated for the purpose of distance measurement, so the safety to nearby objects in the surroundings of the self-vehicle can be ensured.

The intensity of the laser light, output by the laser radar head section 1 such as described above, is classified, according to JIS C6802, into class 1 in which the output intensity is in itself harmless to the human body and classes 2, 3, and 4 in which the output intensity is harmful to the human body. Therefore, if an object far ahead of a self-vehicle is tried to be detected or an inter-vehicle distance is tried to be detected at the time of rainy weather or a thick fog, it will become necessary to raise the laser light intensity to more than class 1.

In the operation of an inter-vehicle distance alarm apparatus using laser light such as this, the laser radar control section 2 outputs control data used for setting a laser light intensity based on the input distance measurement data to the laser radar head section 1. Then, the laser radar head section 1 irradiates the laser light of the set intensity to a preceding vehicle. The laser radar head section 1 measures the inter-vehicle distance based on the period of time from the time point at which laser light is projected toward a preceding vehicle to the time point at which the laser light reflected from the preceding vehicle is received, as is well known in the art, and then outputs the distance measurement data to the laser radar control section 2.

The laser radar control section 2, upon receipt of the distance measurement data from the laser radar head section 1, will fetch a control signal 3S from the light switch 3 as well as the output signal 4S, such as a vehicle speed signal and a steering angle signal, from the sensor section 4. If the control signal 3S is high, the laser radar control section 2 will judge that a self-vehicle is in the process of being stopped and will stop the inter-vehicle distance alarm independently of the inter-vehicle distance based on the distance measurement data.

In addition, even in a case where, based on the output signal 4S, the speed of the vehicle is less than a certain value, or even in a case where the inter-vehicle distance is less than a certain value because the steering wheel was turned in a predetermined direction and the self-vehicle got ahead of a preceding vehicle, the laser radar control section 2 stops the inter-vehicle distance alarm independently of the inter-vehicle distance based on the distance measurement data.

On the other hand, when it is judged from the control signal 3S and the output signal 4S that the self-vehicle is traveling at a constant speed, and if it is judged from the distance measurement data that the inter-vehicle distance to a preceding vehicle is less than a certain value and is dangerous, then the laser radar control section 2 will cause the display device 5 to display an inter-vehicle distance alarm and the speaker 6 to generate an alarm sound.

Thus, in the inter-vehicle distance measuring apparatus using a laser radar, there is a sufficient possibility that only the regular radar control section of the laser radar head section is removed and replaced with an irregular control device so that laser light is irradiated by the another control device, instead of the regular radar control section. In such a case, if the irregular control device has a capability of irradiating laser light of an output intensity of higher than class 1 and is used for purposes other than a normal purpose such as an inter-vehicle distance measurement, then a problem might take place.

BRIEF SUMMARY OF THE INVENTION

Accordingly, the present invention is intended to obviate the above-described problem and has for its object to provide a laser radar apparatus which is capable of determining in its laser radar head section, whether a laser radar control section connected to the laser radar head section is a regular one, and of irradiating laser light only when it is determined that the laser radar control section is a regular one.

In accordance with one aspect of the present invention, there is provided a laser radar apparatus comprising: a laser radar head section for irradiating laser light toward an object of detection and for measuring a distance to the object based on the period of time from a first time point at which the laser light is irradiated to a second time point at which the laser light reflected by the object of detection returns; a laser radar control section connected with the laser radar head section for controlling the operation thereof based on the result of the distance measurement; and identification means provided on the laser radar head section for identifying that the laser radar control section is a regular one.

In accordance with another aspect of the present invention, there is provided a laser radar apparatus comprising: a laser radar head section for irradiating laser light toward an object of detection and for measuring a distance to the object based on the period of time from a first time point at which the laser light is irradiated to a second time point at which the laser light reflected by the object of detection returns; identification means provided on the laser radar head section for transmitting an identification code; a laser radar control section connected with the laser radar head section for controlling the operation thereof based on the result of the distance measurement; and response-code transmission means provided on the laser radar control section for receiving the identification code from the identification means and transmitting a response code corresponding to the identification code; wherein the identification means enables laser irradiation of the laser radar head section when it receives the response code corresponding to the identification code transmitted therefrom.

In a preferred form of the invention, the identification means repeatedly transmits the identification code when it does not receive a correct response code.

In another preferred form of the invention, the identification means transmits laser light whose intensity is harmless to the human body when it does not receive a correct response code.

In still another preferred form of the invention, the identification means stops a laser irradiation operation when it does not receive the response code even after transmission of the identification code a predetermined number of times.

In a further preferred form of the invention, the identification means identifies the laser radar control section only at the time of the starting of the apparatus.

In a further preferred form of the invention, the identification means identifies the laser radar control section at intervals of a predetermined time after the apparatus has been started.

In a further preferred form of the invention, the identification means identifies the laser radar control section at intervals of a predetermined time and at the same time performs the distance measurement processing.

In a further preferred form of the invention, the response-code generation means performs, upon receipt of the identification code, a predetermined operational processing onto the identification code to generate a response code which is known to the identification means.

In a further preferred form of the invention, the response-code transmission means transmits a response code characteristic to the apparatus upon receipt of the identification code.

In a further preferred form of the invention, the identification means generates a random number, performs an operational processing onto the generated random number, and transmits the thus processed random number to the response-code generation means of the laser radar control section as an identification code, and wherein the response-code generation means performs the operational processing to the received identification code and then transmits the processed code to the identification means as a response code.

In a further preferred form of the invention, the identification means transmits an identification code characteristic to the apparatus to the laser radar control section and receives a response code corresponding to the identification code from the laser radar control section.

In a further preferred form of the invention, the identification means and the laser radar control section are each provided with a collation table of identification and response codes; the laser radar control section receives the identification code and then transmits a response code corresponding to the identification code, while referring to the collation table; and the identification means judges whether the received response code is a regular one, while referring to the collation table.

In a further preferred form of the invention, the identification means transmits different kinds of identification codes to the laser radar control section a plurality of times in accordance with the collation table, and judges, from an error rate of the response codes responded with respect to these identification codes, whether the laser radar control section is a regular one.

In a further preferred form of the invention, the identification means generates a warning when an illegal response code is received, in order to prevent analysis of the response code corresponding to the identification code.

In a further preferred form of the invention, the identification means disables, upon receipt of the illegal response code, the laser radar head section which cannot be released by users.

BRIEF DESCRIPTION OF THE DRAWINGS

The above and other objects and advantages will become apparent from the following detailed description when read in conjunction with the accompanying drawings wherein:

FIGS. 9a and 9b are diagrams showing examples of the structure of the transmission data which is transmitted from a laser radar head section according to a seventh embodiment of the present invention to a laser radar control section;

FIGS. 10a and 10b are diagrams showing examples of the data structure where, in the transmission data which is transmitted from a laser radar head section according to the seventh embodiment of the present invention to a laser radar control section, the identification code and the distance measurement data can be transmitted at the same time;

DETAILED DESCRIPTION OF THE PREFERRED EMBODIMENTS

Embodiment 1

Figure 1:
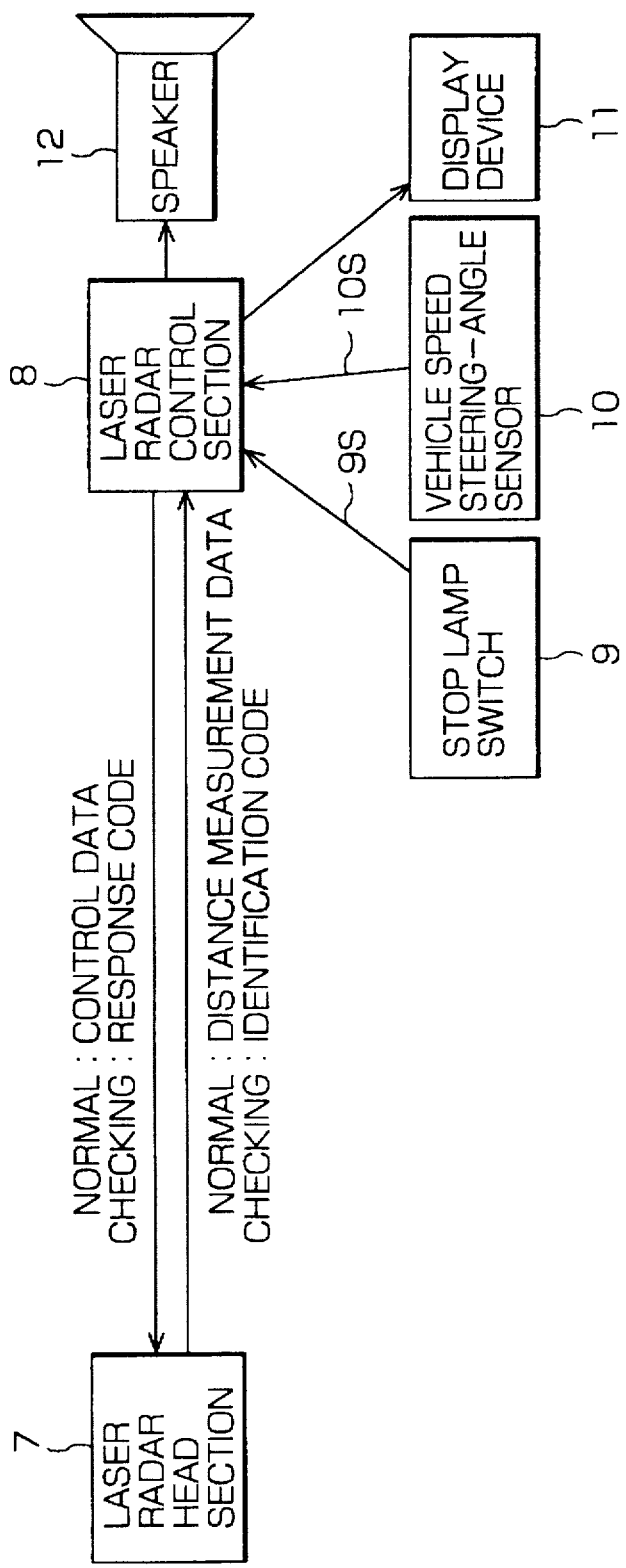
FIG. 1 is a block diagram showing an inter-vehicle distance alarm apparatus according to a first embodiment of the present invention.

A preferred embodiment of the present invention will hereinafter be described in detail with reference to the accompanying drawings. FIG. 1 is a block diagram showing an inter-vehicle distance alarm apparatus using a laser radar apparatus, according to this embodiment of the present invention. In FIG. 1, the functions of a stop lamp switch 9, a sensor section 10 for detecting various kinds of the operating states of a vehicle sensor and a steering-angle sensor and outputting a signal, a display device 11 for displaying various data such as an inter-vehicle distance to a driver, and a speaker 12 for giving an alarm when an inter-vehicle distance becomes shortened to less than a certain value, are the same as those of the conventional apparatus.

A laser radar head section 7 in this embodiment transmits an identification code to a laser radar control section 8, in irradiating laser light, and is enabled to irradiate laser light when receiving a predetermined response code from the laser radar control section 8 in response to this identification code. Therefore, in a case where a regular laser radar control section has not been connected to the laser radar head section 7, the irradiation of the laser light becomes impossible because it is obvious that the response code corresponding to the identification code is not sent back by the laser radar control section.

But, in a case where the regular laser radar control section 8 has been connected to the laser radar head section 7, the distance measurement data and the control data are intercommunicated between the laser radar control section 8 and the laser radar head section 7. If the distance measurement data is input to the laser radar control section 8 by the laser radar head section 7, then the laser radar control section 8 will judge, from the control signal S9 of the stop lamp switch 9 and the output signal 10S of the sensor section 10, whether the measured inter-vehicle distance becomes a dangerous inter-vehicle distance. If it is judged that the measured inter-vehicle distance is a dangerous inter-vehicle distance, the laser radar control section 8 will cause a speaker 12 to give an alarm sound. In addition, various kinds of data at this time are displayed on the display device 11.

Figure 2:
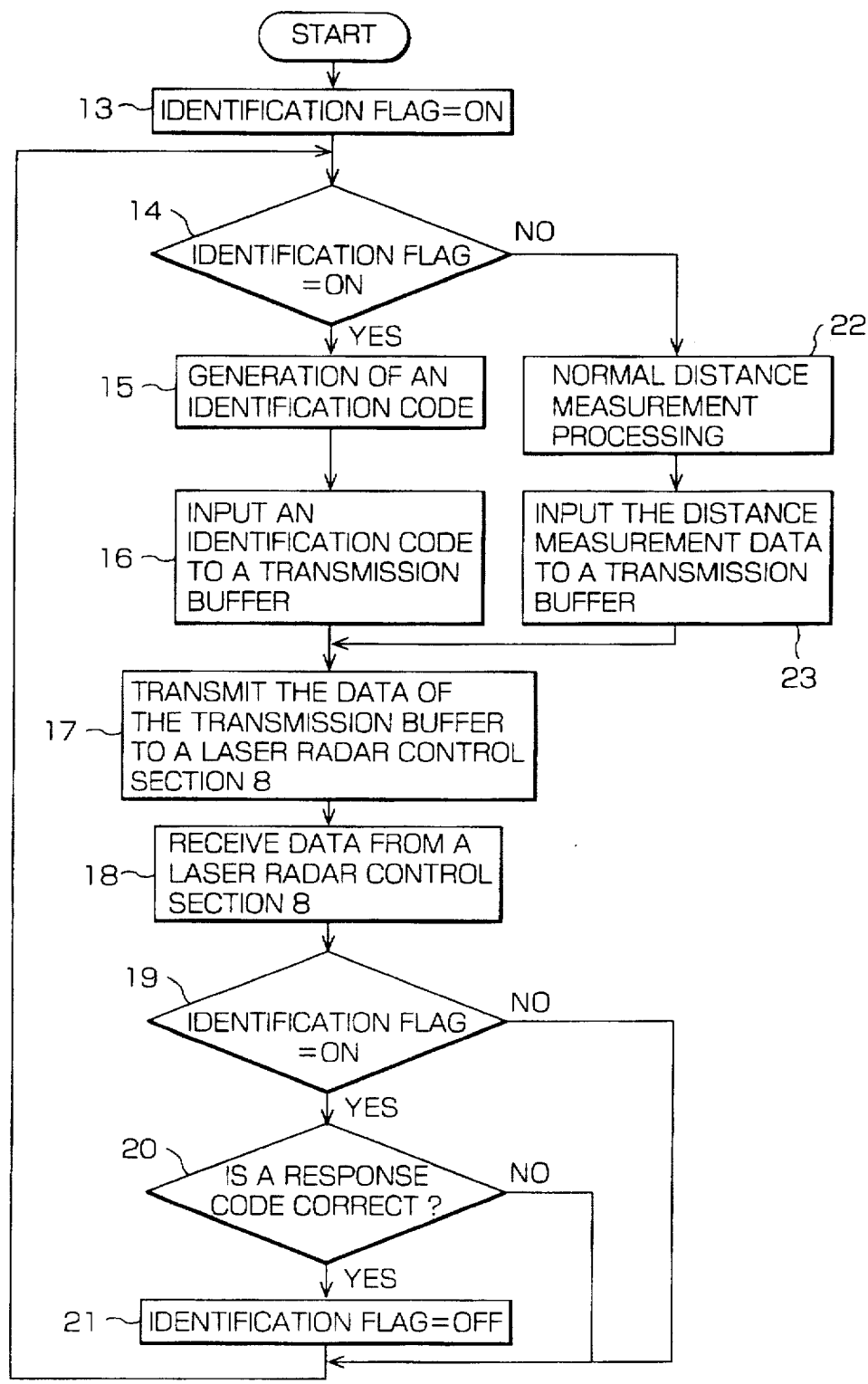
FIG. 2 is a flowchart showing the processing of the laser radar head section according to the first embodiment of the present invention.

The processing of the laser radar head section 7 will hereinafter be described according to a flowchart of FIG. 2. This flowchart explains the operation of the laser radar head section 7 which identifies whether the laser radar control section 8 connected to the laser radar head section 7 is a regular one. In step 13 an identification flag is set to "ON" as an initial state. In step 14 it is judged whether the identification flag is ON or not. If "ON," in step 15 an identification code will be generated and in step 16 the identification code (FIG. 9(a)) will be input to a transmission buffer (not shown) instead of the distance measurement data.

On the other hand, if the identification flag is "OFF," the identification of the laser radar control section 8 will not be performed, and in step 22, laser light is irradiated and a normal distance measurement (inter-vehicle distance measurement) is made. In step 23 the distance measurement (FIG. 9(b)) is input to the transmission buffer. In step 17 the identification code or distance measurement data stored in the transmission buffer is transmitted to the laser radar control section 8. In response to the transmitted data, in step 18 the laser radar head section 7 receives the data transmitted from the laser radar control section 8.

If it is judged in step 19 that in step 14 the identification flag has been set to ON, it will be judged in step 20 whether the received data is correct or not as a response code. If the received data is correct, in step 21 the identification flag will be set to OFF and step 21 will return back to step 14. At this time, because the identification flag in step 14 is OFF, in step 22 a normal distance measurement process is performed by laser light irradiation. But, when in step 19 the identification flag is not ON, the control data corresponding to the distance measurement data is responded from the laser radar control section 8. Therefore, in step 22 the laser irradiation is performed based on the control data and the distance measurement process is continued.

In addition, when in step 20 the response code is not correct although the identification flag is ON, step 20 returns back to step 14. After it is judged that the identification flag is ON, in step 15 an identification code is again generated and is transmitted to the laser radar control section 8. Thereafter, during the time the identification code is ON, steps 14 to 20 are repeated until a correct response code is obtained. As a consequence, unless a correct response code corresponding to the identification code is returned from the laser radar control section 8, laser irradiation is not made, and therefore safety is enhanced.

Figure 3:
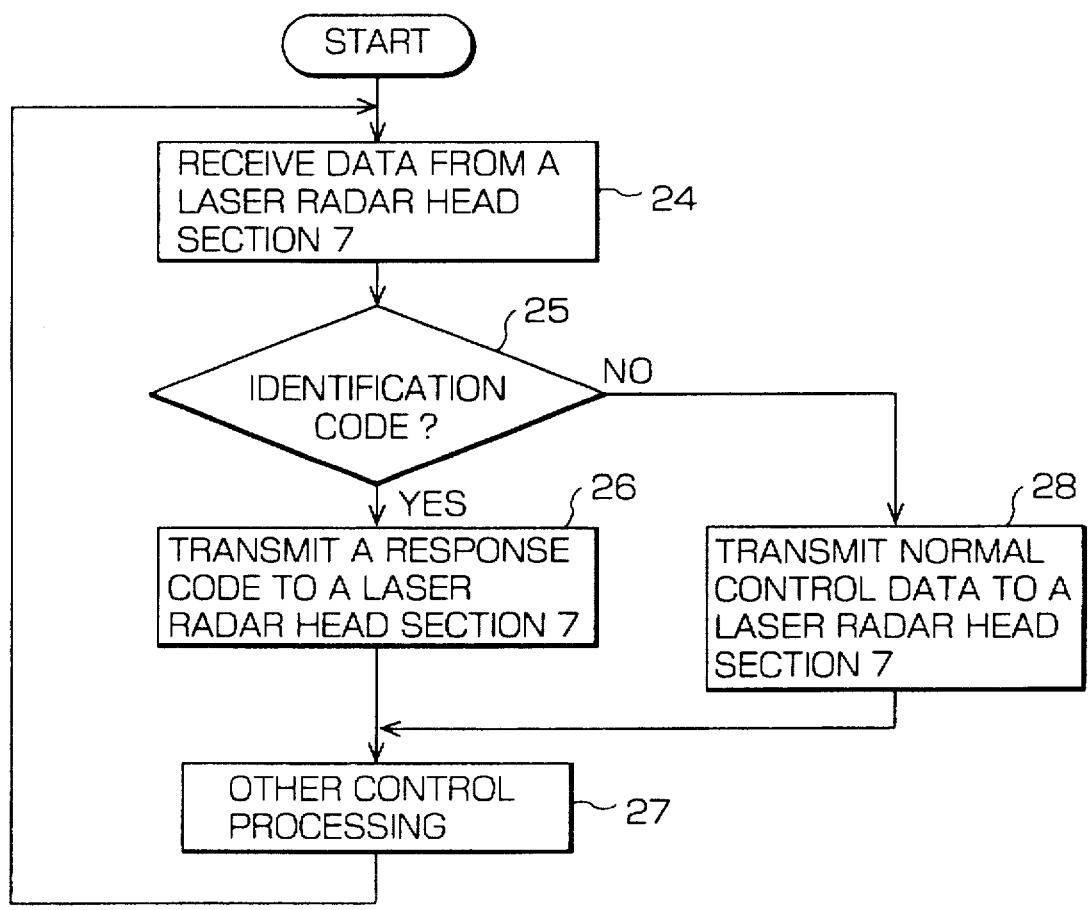
FIG. 3 is a flowchart showing the processing of the laser radar control section according to the first embodiment of the present invention.

FIG. 3 is a flowchart showing the processing of the laser radar control section 8 which transmits a response code in response to an identification code. In step 24 the data from the laser radar head section 7 is received. In step 25 it is judged whether the received data is an identification code or distance measurement data. If the received data is an identification code, in step 26 a response code will be generated.

and the generated code will be transmitted to the laser radar head section 7 instead of control data. If, on the other hand, the received data is distance measurement data, a normal process such as a distance measurement process will be performed. That is, in step 28, control data is transmitted to the laser radar head section 7 and laser light irradiation is made possible. If the transmission process is ended in steps 26 and 27, a control process other than the data transmission process with respect to the laser radar head section 7, such as a monitoring process of the control signal 9S of the stop lamp switch 9 and the output signal 10S of the sensor section 10, will be performed in step 27, and step 27 will return back to step 24.

Therefore, even if another control device were used instead of the laser radar control section 8 and only the laser radar head section 7 were tried to be used illegally, it would impossible for the laser radar control section 8 to generate a response code corresponding to an identification code and to transmit it to the laser radar head section 7 and therefore it would become impossible for the laser radar head section 7 to output laser light.

Unless the laser radar control section 8 knows a method of generating a response code, the laser radar head section 7 does not reach its normal state, and consequently, laser light is not irradiated and safety is ensured. In addition, the checking of the illegal use of the laser radar head section 7 can be performed only by intercommunicating an identification code and a response code in addition to communication data normally used, and consequently, parts for checking illegal use do not need to be added.

Embodiment 2

Figure 4:
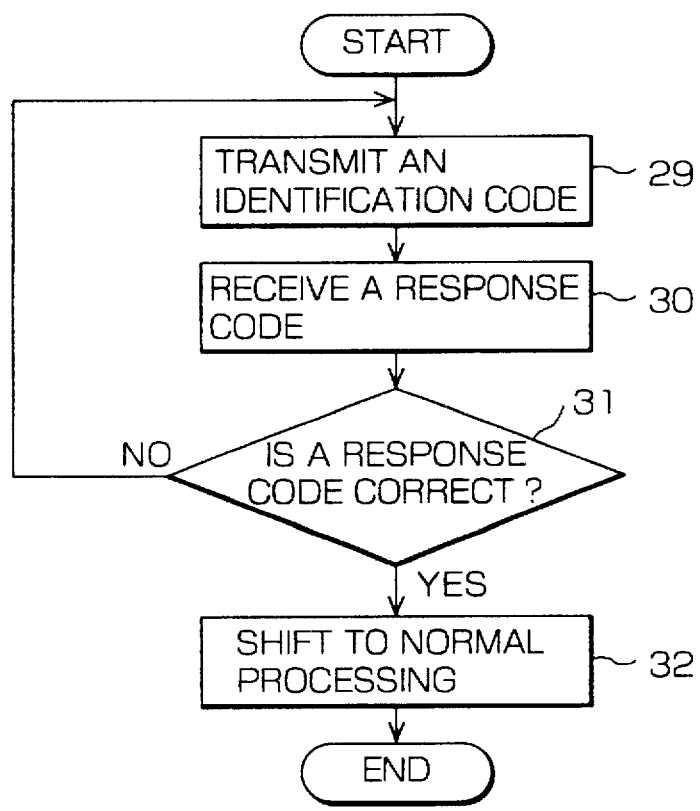
FIG. 4 is a flowchart showing the process in which, when in a laser radar head section according to a second embodiment of the present invention a response code is not correct, an identification code is repeatedly transmitted.

A laser radar head section 7 in this embodiment repeatedly transmits an identification code generated when a received response code is not correct. FIG. 4 is a flowchart used to explain the processing of this embodiment. In step 29 an identification code is transmitted to the laser radar control section 8. In step 30, a response code, transmitted from the laser radar control section 8 in response to the identification code, is received.

In step 31 the laser radar head section 7 judges if the response code is correct or not. If the response code is correct, in step 31 a normal process for laser light irradiation will be performed. If, on the other hand, the response code is not correct, step 31 will return to step 29. In step 29 the transmission of the identification code is continued until a correct response code is transmitted. As a consequence, even in a case where a correct response code does not return accidentally depending upon the use environments of the laser radar apparatus, there is no possibility that it is impatiently judged that the laser radar control section 8 is not a regular one.

Embodiment 3

In the aforementioned embodiment 1 and 2, during the time a regular response code corresponding to an identification code is not sent back, the identification code is repeatedly transmitted and the distance measurement process is made impossible during that time. In this embodiment, in a case where the response code received by the laser radar head section 7 is not correct, the processing of this embodiment is made so that only laser light whose output intensity is class 1 is irradiated.

Figure 5:
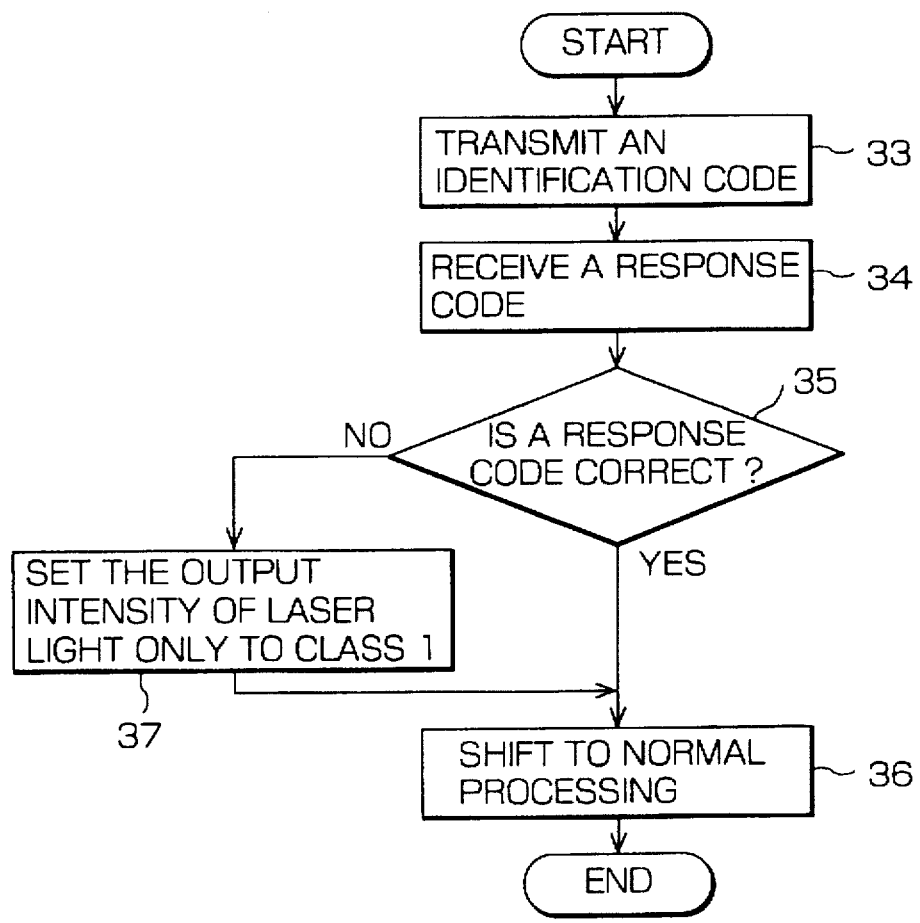
FIG. 5 is a flowchart showing the process in which, when in a laser radar head section according to a third embodiment of the present invention a response code is not correct, only the laser light whose output intensity is class 1 is output.

FIG. 5 is a flowchart used to explain the processing of this embodiment. In step 33 an identification code is transmitted to the laser radar control section 8. In step 34 a response code is received. In step 35 it is judged whether the response code is correct. If the response code is correct, in step 36 the operation will be shifted to a normal process for laser light irradiation. If the response code is not correct, in step 37 the laser radar head section 7 will be set so that only laser light whose output intensity is class 1 is irradiated, and step 37 will advance to step 36. As a result, even if trouble occurred in the laser radar control section 8, attaining measurement of a certain inter-vehicle distance may become possible. Therefore, the safety of the human body can be ensured at a minimum.

Embodiment 4

In the aforementioned embodiment 1 and 2, during the time a regular response code corresponding to an identification code is not sent back, the identification code has been repeatedly transmitted. In this embodiment, in a case where the laser radar control section 8 did not transmit a correct response code even if the laser radar head 7 transmitted the identification code a predetermined number of times, it is judged that the use of the laser radar control section is illegal, and the laser radar head section 7 performs a process which stops an operation for laser light irradiation.

Figure 6:
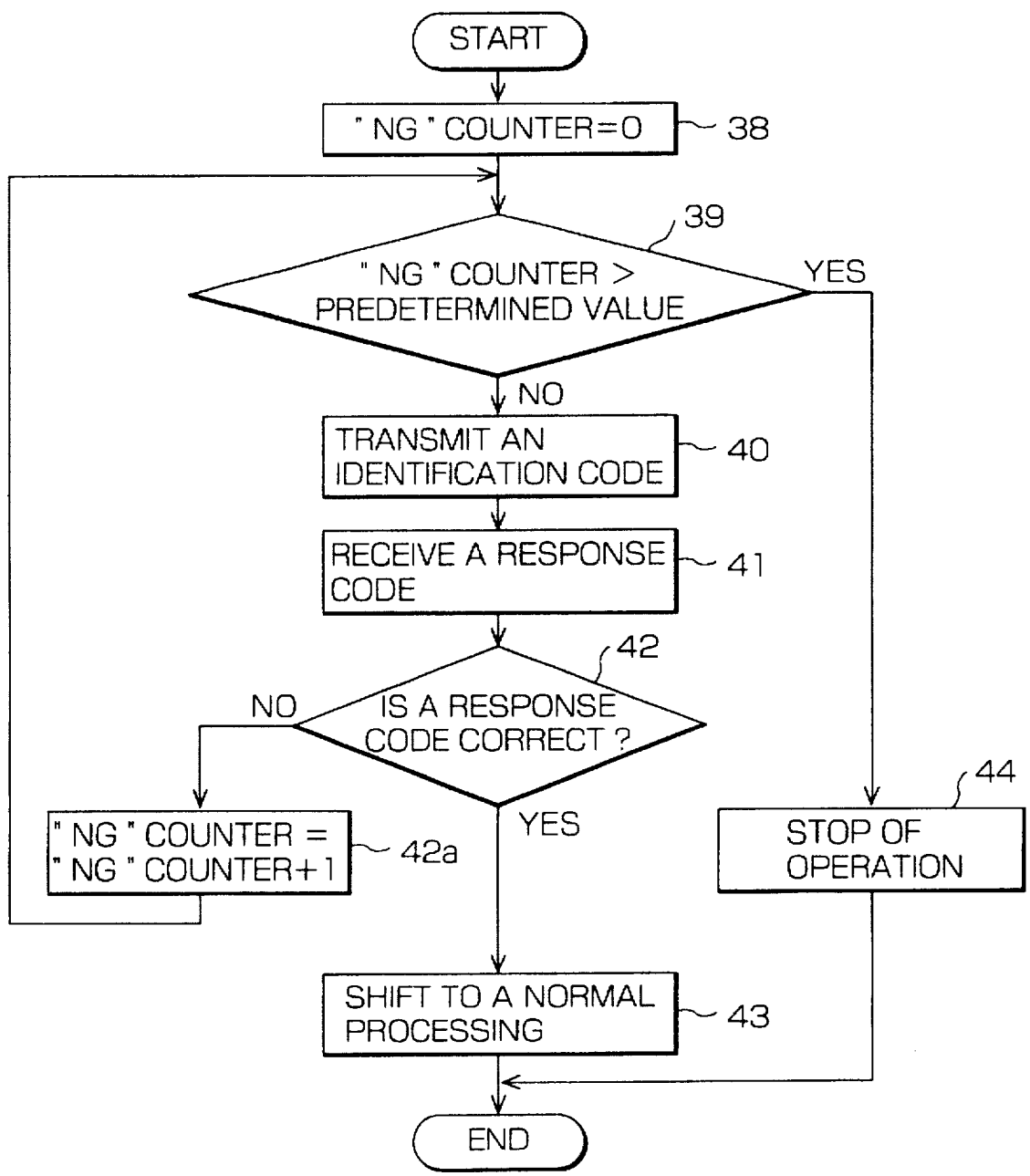
FIG. 6 is a flowchart showing the process in which, when in a laser radar head section according to a fourth embodiment of the present invention a response code is not correct even if an identification code is transmitted a predetermined number of times, an operation is stopped.

FIG. 6 is a flowchart used to explain the processing of this embodiment. In step 38 an NG counter, i.e., a counter which counts the number of times of an incorrect response code sent back with respect to the transmission of the identification code is initialized to zero. In step 39 it is judged whether the count value of the NG counter has exceeded a predetermined number of times. That is, it is judged whether the reception number of times of an incorrect response code has exceeded a predetermined number of times.

If the reception number of times has exceeded a predetermined number of times, in step 40 the identification code will be again transmitted to the laser radar control section 8. Then, in step 41 a response code is received. In step 42 it is judged whether the received response code is correct or not, and if correct, in step 43 a shift to a normal process such as laser light irradiation will be performed. If, on the other hand, the response code is not correct, in step 42a the NG counter will be incremented by 1 and step 42a will return back to step 39.

If it is judged that the response code is not correct at every reception of the response code, steps 39 to 42a will be repeated. If it is judged in step 39 that the count value of the NG counter has exceeded a predetermined value, in step 44 the laser radar head section will stop all operations and stop the illegal laser irradiation of the laser radar control section 8.

When the illegal use is judged, the laser radar head section 7 stores the fact of the illegal use in a nonvolatile memory, and the operation of the laser radar head section is locked to its stopped state. The release of this lock state is made so that it cannot be executed unless a releasing operation is performed on a manufacturer side, whereby illegal use can also be made difficult.

In addition, even in the laser radar control section 8, in order to prevent for an illegal user from analyzing a response code when it is judged that the transmission data from the laser radar head section 7 is illegal data, the operation of the laser radar control section 8 is stopped, and the release of the operation stop is made so that it cannot be executed unless a releasing operation is performed on a manufacturer side, whereby illegal use can also be made difficult.

Furthermore, instead of temporarily stopping an operation when illegal use is detected, "there is a danger that laser light is irradiated", etc., is displayed on a display device, whereby an attention can also be given to users.

Embodiment 5

Figure 7:
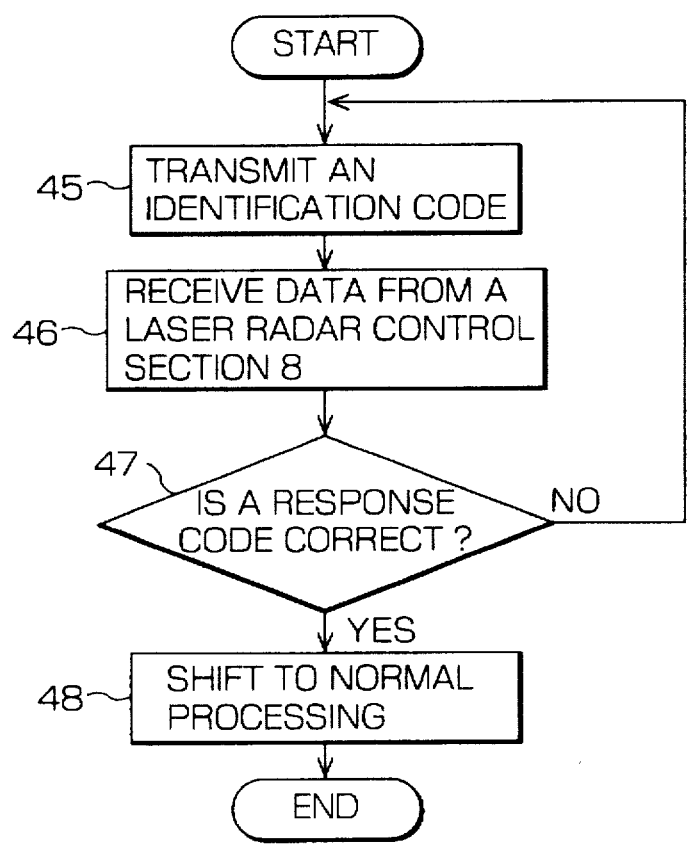
FIG. 7 is a flowchart showing an example in which, in a laser radar head section according to a fifth embodiment of the present invention, identification processing is performed only at the time of starting.

FIG. 7 is a flowchart showing an example where, in the laser radar head section 7, identification processing is performed only at the time of the starting of the apparatus. During the time the apparatus operation is not stabilized immediately after a power source to the apparatus is turned on, there is a possibility that a correct response code would not be transmitted in response to an identification code, even if a regular laser radar control device 8 were connected. For this reason, the identification processing is performed only at the time of the starting of the power source. The power source is turned on, and in step 45, the started laser radar head section 7 transmits an identification code to the laser radar control section 8. In step 46 the laser radar head section 7 receives a response code from the laser radar control section 8.

In step 47 it is judged whether the received response code is correct or not. If correct, in step 48 a shift to a normal process such as laser light irradiation will be performed. If, on the other hand, the response code is not correct, step 47 will return to step 45 and the transmission processing of the identification code will be repeated. As a consequence, accuracy in the identification processing is enhanced.

Embodiment 6

Figure 8:
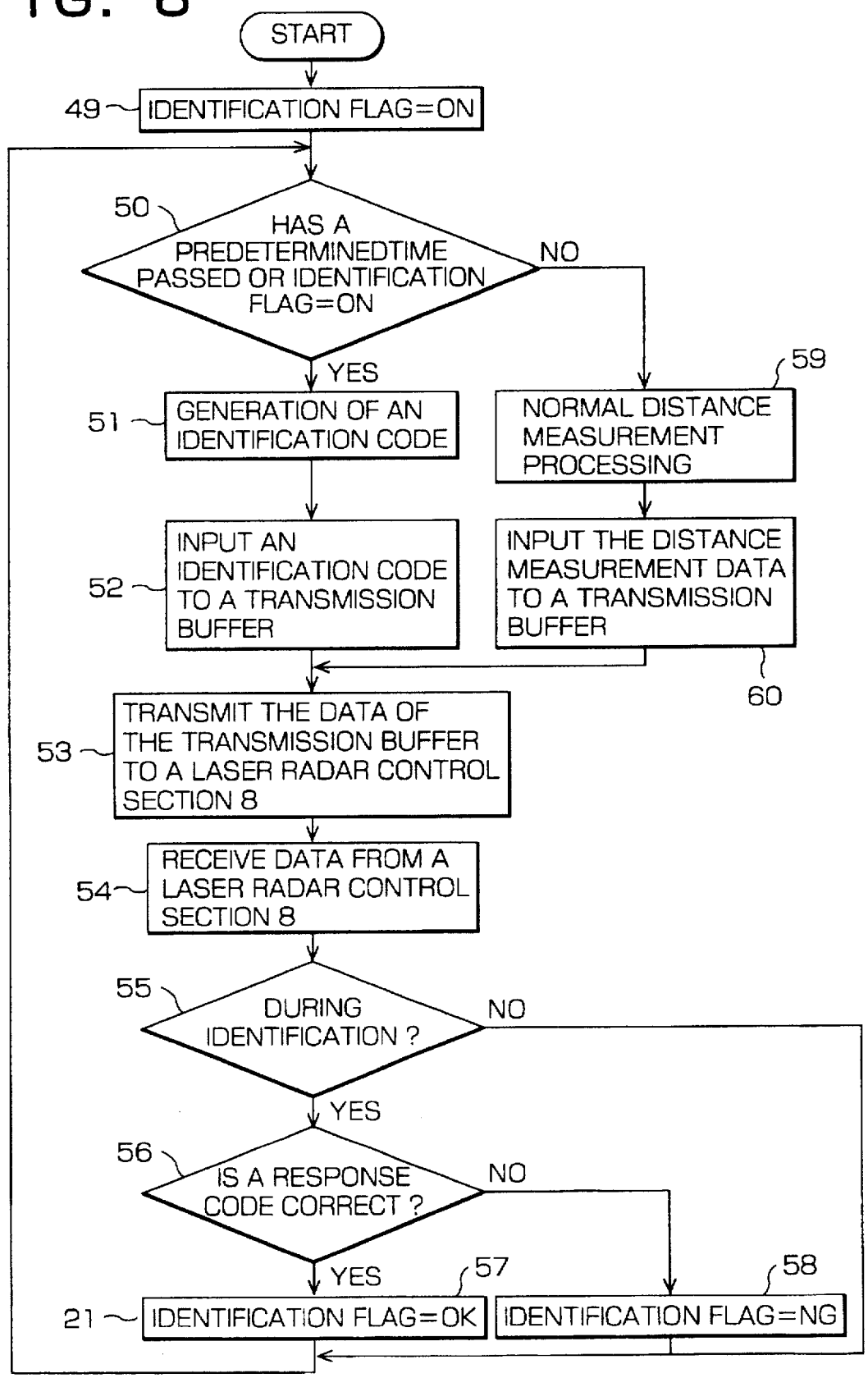
FIG. 8 is a flowchart showing the process in which, in a laser radar head section according to a sixth embodiment of the present invention, identification processing is performed at fixed intervals of time.

FIG. 8 is a flowchart used to explain the processing operation where, in the laser radar head section 7, the identification processing is performed at fixed intervals of time. The purpose of this processing is to prevent that another laser radar control device is connected to illegally irradiate laser light after the laser light irradiation state is maintained, because the laser light irradiation state can be maintained if a power source and a regular laser radar control device 8 is connected to the laser radar head section 7 and then the identification processing is completed.

In step 49 an identification flag is set to "NG" in order to represent non-generation of an identification code. In step 50 it is judged whether the identification flag is "NG" or not. If the identification flag is NG, in step 51 an identification code will be generated. In step 52 the identification code is input to the transmission buffer.

In step 53 the data of the transmission buffer is transmitted to the laser radar control section 8. Then, the data is received from the laser radar control section 8. In step 55 it is judged whether the laser radar head section 7 is in process of identification, based on the identification flag. Then, if it is judged that the laser radar head section 7 is in process of identification, the received data will be handled as a response code. If the laser radar head section 7 is not in process of identification but in normal processing, the received data will be handled as control data.

If a response code is received during identification, in step 56 it will be judged whether the response code is correct. If the response code is correct, in step 56 the identification flag will be set to "OK." If, on the other hand, the response code is not correct, in step 58 the identification flag will be set to "NG," and step 58 will return to step 50. If it is judged that the identification code is NG, the identification processing in steps 51 to 57 will be repeated until the identification flag becomes OK. If the identification flag is OK, in step 59 laser light will be irradiated and a distance measurement will be made. In step 60 the distance measurement data is input to the transmission buffer.

However, after the irradiation state of the laser light is maintained, it becomes possible to connect another laser radar control section instead of the regular laser radar control section 8 and to irradiate laser light illegally. For this reason, if it is judged that a predetermined time has passed after normal distance measurement processing, the distance measurement processing will be interrupted and in step 51 an identification code will be again generated. In step 52 the identification code is input to the transmission buffer and is transmitted to the laser radar control section 8. As a consequence, if it is judged in step 56 that a response code corresponding to the identification code has been received, then in step 57 the identification code will be set to OK. In step 59 the distance measurement processing is continued.

If, on the other hand, an illegal laser radar control section is connected and a response code is not correct, the identification processing in steps 50 to 58 will be repeated. Therefore, because an illegal laser radar control section can be detected even after the operation of the apparatus and the illegal laser light irradiation can be stopped, safety is further enhanced.

Embodiment 7

In the processing of the embodiment 6, the transmission data which is transmitted from the laser radar head section 7 to the laser radar control section 8 is constructed as shown in FIG. 9. That is, for the data at the time of the identification code transmission, as shown in FIG. 9(a), the identification flag is ON and the data content is an identification code. For the data at the time of the distance measurement data transmission, as shown in FIG. 9(b), the identification flag is OFF and the data content is distance measurement data.

Therefore, the content of the transmission data from the laser radar head section 7 varies during identification processing and during distance measurement processing, and during identification processing, distance measurement data cannot be transmitted. In order to improve this, as shown in FIG. 10(a), an area for distance measurement data is also assured in transmission data in advance together with an area for an identification code.

In addition, as shown in FIG. 10(b), areas for control data and a response code are assured in the transmission data from the laser radar control section 8 to the laser radar head section 7. As a result of this, the quantity of the transmission data that is transmitted from the laser radar head section 7 is increased by the amount of the identification code in addition to the distance measurement data. But since the distance measurement data for distance measurement processing and the identification code can be transmitted at the same time, the identification processing and the distance measurement processing can be executed at the same time.

Figure 11:
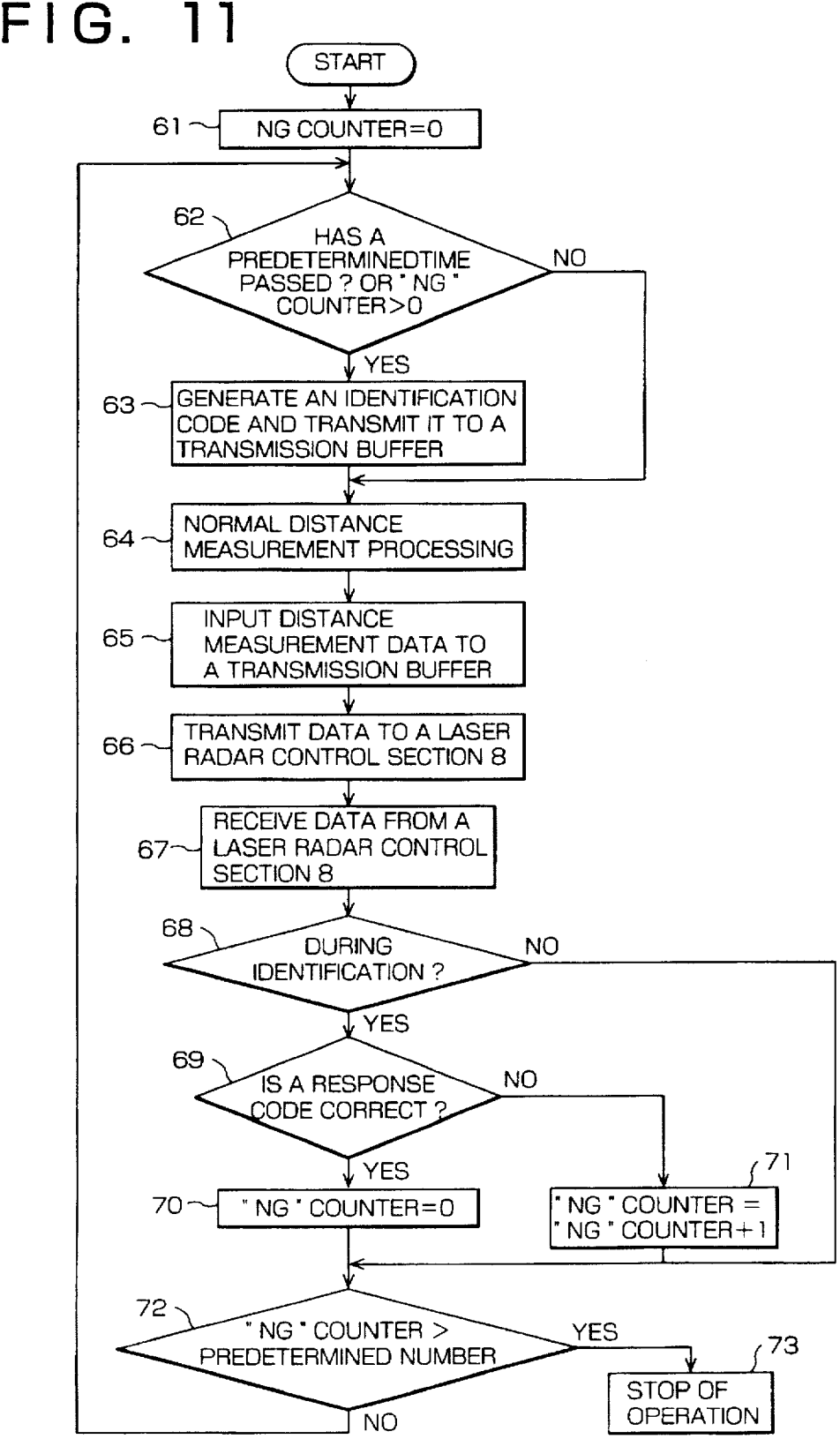
FIG. 11 is a flowchart showing the process in which, in the laser radar head section according to the seventh embodiment of the present invention, the identification processing is performed at fixed intervals of time, but the distance measurement is continued also during the identification processing.

FIG. 11 is a flowchart showing the processing where, in the laser radar head section 7, the identification processing is performed at fixed intervals of time and at the same time the distance measurement is also continued with the transmission data of FIG. 10(a) even during identification processing. In this processing, if a predetermined time has passed after laser light irradiation, an identification code will be generated while continuing normal distance measurement processing, and then will be transmitted to the laser radar control section 8. As a result of this, if a regular response code corresponding to the identification code is received, then laser light will be irradiated and distance measurement processing will be continued.

However, if an illegal laser radar control section is connected and a response code is not correct, laser light irradiation will be stopped. With the regular laser radar control section 8 connected to the laser radar head section 7, first, in step 61 the NG counter is cleared to zero. In step 62, if it is judged that the count value of the NG counter is less than zero, in step 64 laser light will be irradiated and distance measurement processing of normal processing will be made. In step 65 the distance measurement data is input to the transmission buffer.

In step 66 the distance measurement data is transmitted to the laser radar control section 8. In step 67 the data is received from the laser radar control section 8. If it is judged in step 68 that the laser radar head section 7 is not in an identification process, in step 72 it will be judged whether the count value of the NG counter is greater than a predetermined number of times. If "NO," step 62 will be again executed and then the distance measurement processing in step 64 will be continued.

In the middle phase of time that the distance measurement processing is continued by the laser light irradiation, in step 62 it is judged that a predetermined time has passed. If a predetermined time has passed, in step 63 an identification code will be generated in the transmission data and input to the transmission buffer, for the identification of the laser radar control section 8. In this case, since the transmission data, transmitted from the laser radar head section 7 to the laser radar control section 8, is provided with both an identification code area and a distance measurement data area, as shown in FIG. 10(a), both the identification processing and the distance measurement processing can be continued.

Therefore, in step 64 the distance measurement processing is performed and in step 65 the distance measurement data is input to the transmission buffer. Then, in step 66, together with the identification code, the distance measurement data is transmitted to the laser radar control section 8. After the data transmission, in step 67 the data is transmitted from the laser radar control section 8. Then, if in step 68 it is judged, from the identification flag, that the laser radar head 7 is in an identification process, in step 69 it will be judged whether the response code is correct or not. If the response code is correct, in step 70 the NG counter will be set to zero. If the response code is not correct, in step 71 the NG counter will be incremented by 1.

In step 72 it is judged whether the count value of the NG counter is greater than a predetermined number of times. If "YES," in step 73 the operation of the laser radar head section 7 will be stopped. If "NO," step 70 will return to step 62. If the counter value of the NG counter is greater than zero, the identification processing in steps 63 to 70 will be again performed. In step 72, if the count value of the NG counter becomes greater than a predetermined number of times, it will be judged that a regular laser radar control section 8 is not connected to the laser radar head section 7, and the operation of the laser radar head section 7 will be stopped in step 73. But, if a correct response code is returned after the identification processing is repeated some times, in step 70 the NG counter will be set to zero. As a result, the generation of the identification code is stopped until a predetermined time passes, and only the normal distance measurement processing in step 64 is performed. As a result, data processing efficiency is enhanced because there is no possibility that the distance measurement processing is interrupted during identification processing.

Embodiment 8

Figure 12:
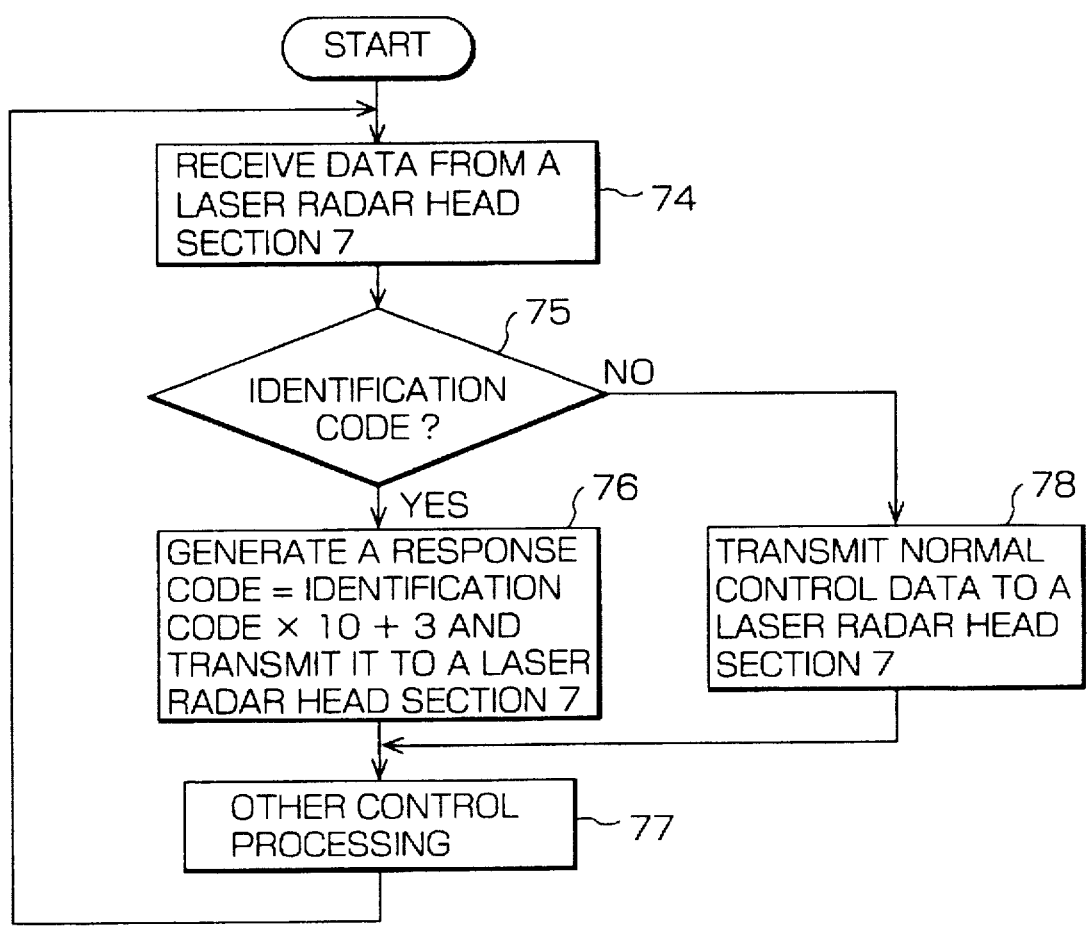
FIG. 12 is a flowchart showing an example of the process in which a predetermined calculation is given to an identification code as a method of generating a response code, in a laser radar control section according to an eighth embodiment of the present invention.

FIG. 12 is a flowchart showing an example of the process in which a predetermined calculation is given to an identification code as a method of generating a response code in the laser radar control section. In step 74 the data from the laser radar head section 7 is received. In step 75 it is judged whether the received data is an identification code or not. If the received data is an identification code, in step 76 a response code will be generated and transmitted to the laser radar head section 7. In this embodiment, a calculation of (identification code×10)+3 is given to the identification code to generate a response code, and the generated response code is transmitted to the laser radar head section 7. If, on the other hand, the received data is not an identification code, in step 78 normal control data will be transmitted to the laser radar head section 7.

In step 77, control processing other than the control processing with respect to the laser radar head section 7 is performed, and step 77 returns to step 74. The transmitted response code is received by the laser radar head section 7. The same calculation processing as that performed in the laser radar control section 8 to generate the response code is given by the laser radar head section 7 to an identification code which is transmitted, and in this way, the laser radar head section 7 generates the same response code in advance. By comparing the generated response code with the response code received from the laser radar control section 8, it is judged whether the response code is correct or not.

Therefore, if the laser radar control section does not know a predetermined calculation equation, it will become impossible to generate a correct response code corresponding to an identification code. In addition, even if identification codes in a limited range were used, a wide variety of response codes could be generated only by updating the calculation equation. For this reason, secrecy in the response code is enhanced.

Embodiment 9

Figure 13:
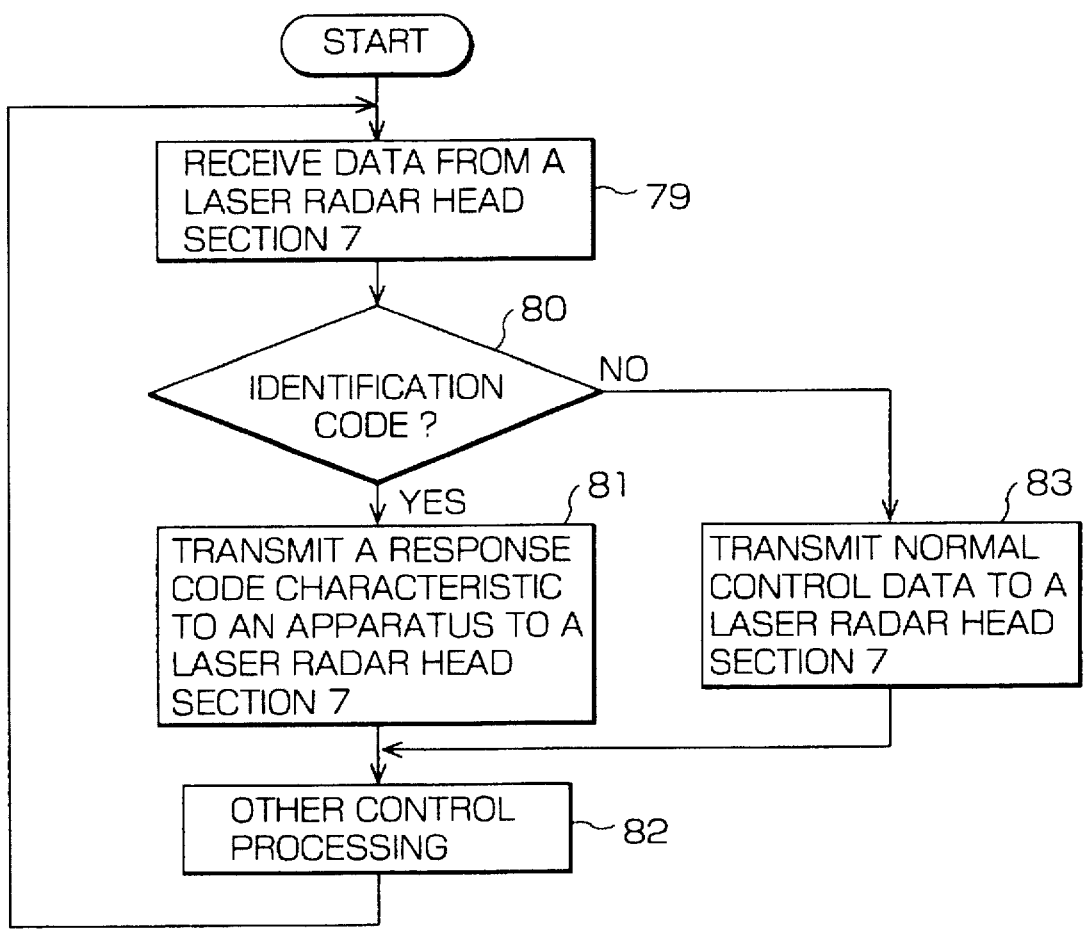
FIG. 13 is a flowchart of a case where the response code in a laser radar control section according to a ninth embodiment of the present invention is specific to an apparatus.

FIG. 13 is a flowchart of a case where the response code in the laser radar control section 8 is characteristic to a laser radar apparatus. In step 79, the laser radar control section 8 receives the data from the laser radar head section 7. In step 80 it is judged whether the received data is an identification code. If the data is an identification code, in step 81 the response code characteristic to the laser radar apparatus will be transmitted to the laser radar head section 7. If, on the other hand, the data is not an identification code, in step 83 normal control data will be transmitted to the laser radar head section 7. After transmission processing, in step 82 the laser radar control section 8 performs control processing other than the control processing with respect to the laser radar head section 7, and step 82 returns to step 79.

The laser radar head section 7 stores the response code characteristic to the laser radar apparatus in advance. Therefore, by comparing the stored response code with the response code received from the laser radar control section 8, it can be readily judged whether the laser radar control section 8 being connected is a regular one or not.

Embodiment 10

Figure 14:
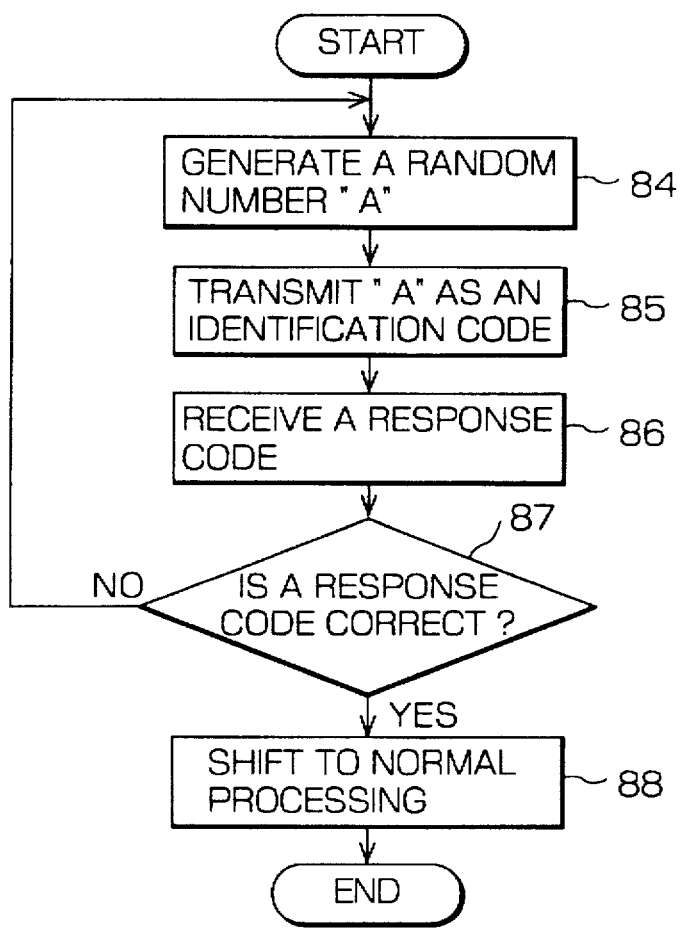
FIG. 14 is a flowchart of the process where the identification code of a laser radar head section according to a tenth embodiment of the present invention is generated with random numbers.

FIG. 14 is a flowchart of the process where the identification code of the laser radar head section 7 is generated with random numbers. In step 84, the laser radar head section 7 generates a random number A and gives a predetermined calculation process to this random number A to generate a response code in advance. Then, in step 85 the random number A is transmitted to the laser radar control section 8 as an identification code. In the laser radar control section 8, the calculation process performed in the laser radar head section 7 is given to the received random number A to generate a response code, and the generated response code is transmitted to the laser radar head section 7. In step 87, the laser radar head section 7 compares the previously generated response code with the received response code. If both the codes match with each other, it will be judged that the response code is a correct one. In step 88, normal processing is performed, i.e., laser light is irradiated and a distance measurement is made. If, on the other hand, the response code is not correct, step 87 will return to step 84 and the identification processing will be repeated. As a consequence, there is less of a possibility for the same kind of response code to occur, and secrecy in the response code is further strengthened.

Embodiment 11

Figures 15, 16:
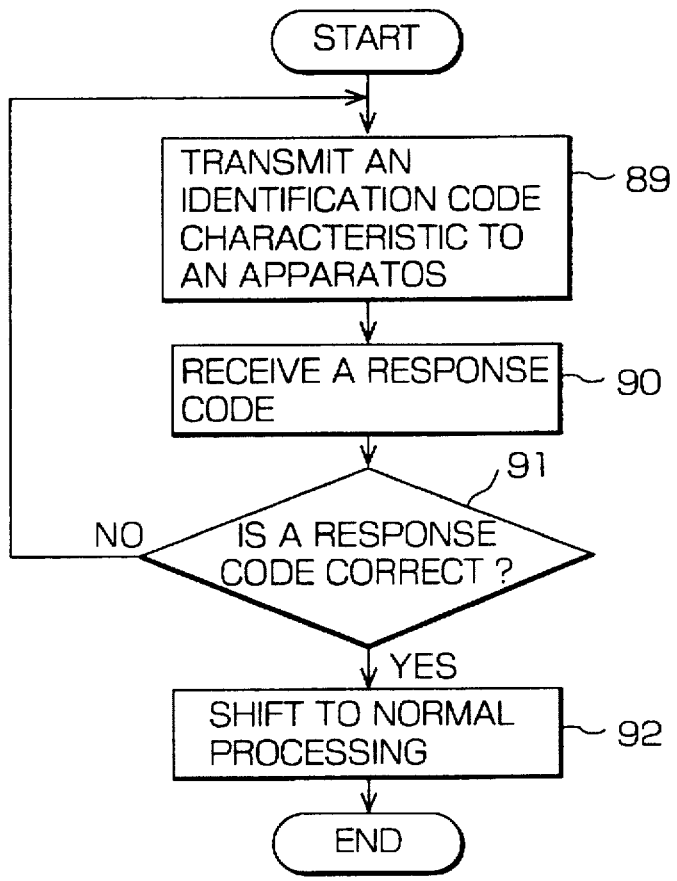
FIG. 15 is a flowchart of the process where a value characteristic to an apparatus is transmitted as an identification code of a laser radar head section according to an eleventh embodiment of the present invention.
FIG. 16 is a collation table of identification and response codes according to twelfth and thirteenth embodiments of the present invention.
Figure 17:
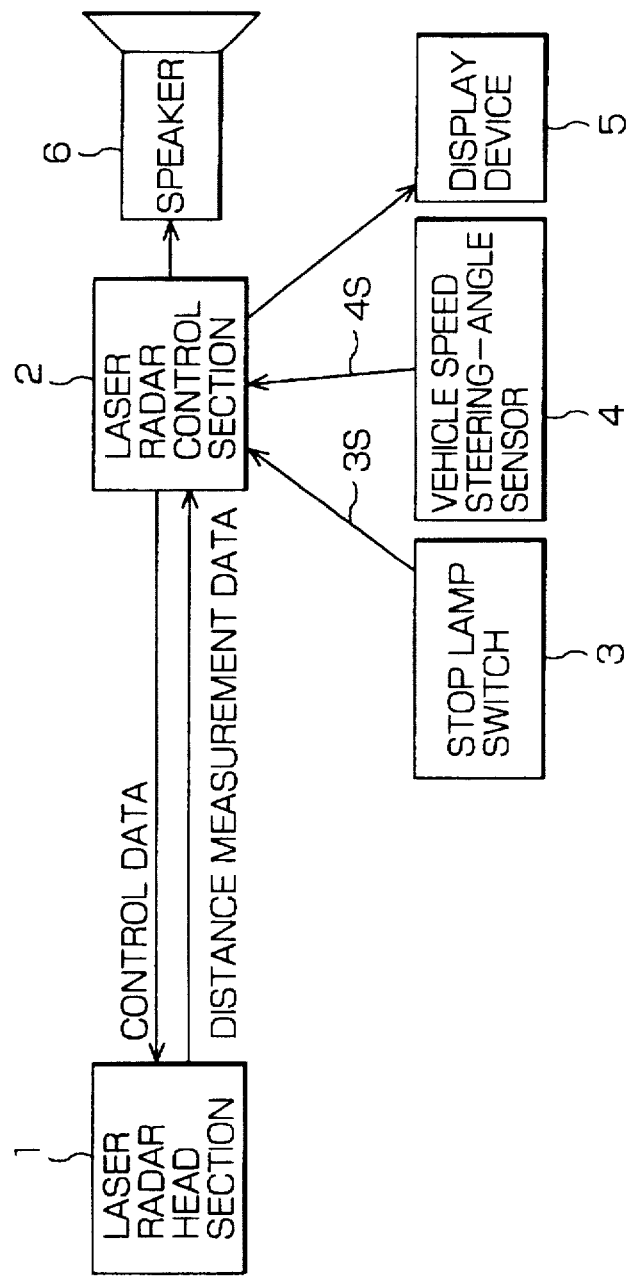
FIG. 17 is a block diagram showing a conventional inter-vehicle distance alarm apparatus.

FIG. 15 is a flowchart of the process where an identification code characteristic to an apparatus is transmitted as an identification code of the laser radar head section 7. In step 89, the laser radar head section 7 transmits an identification code characteristic to an apparatus to the laser radar control section 8. The laser radar control section 8 transmits a response code in response to the identification code. In step 90 the laser radar head section 7 receives the response code. In step 91 it is judged whether the response code is a correct response code corresponding to the identification code. If the response code is correct, in step 92 normal processing, such as distance measurement processing performed by laser light irradiation, will be performed. If, on the other hand, the response code is not correct, step 91 will return to step 89 and the identification processing will be repeated. As a consequence, with simpler construction, it can be decided whether the laser radar control section 8 being connected is a regular laser radar control section.

Embodiment 12

FIG. 16 is a collation table of an identification code and a response code corresponding to the identification code. The laser radar head section 7 and the laser radar control section 8 are both provided with the collation table. In the laser radar control section 8, a response code corresponding to an identification code is transmitted to the laser radar head section 7. Also, in laser radar head section 7, a response code is obtained from the collation table, and the identification processing can be performed by comparing the obtained response code with the response code transmitted from the laser radar control section 8. Therefore, because the generation of the response code can be facilitated, the identification processing speed is enhanced.

Embodiment 13

In the aforementioned embodiments 1-12, the operation is shifted to normal processing, such as distance measurement processing performed by laser light irradiation, when a response code corresponding to an identification code is correct even once. However, there is the possibility that a correct response code is received accidentally, even when a regular laser radar control section is not connected. Therefore, it cannot be always said that a single response-code matching operation can accurately judge a regular laser radar control section.

Therefore, in this embodiment, the laser radar head section 7 and the laser radar control section 8 each are provided with the collation table shown in FIG. 16, and the laser radar head section 7 transmits an identification code about ten times while varying the contents of the identification code in accordance with the collation table. As a result of this transmission, the laser radar control section 8 transmits a response code of "3" in response to the first identification code, while referring to the collation table, and transmits a response code of "10" in response to the second identification code and a response code of "4" in response to the third identification code. In this way, the laser radar control section 8 transmits a response code corresponding to each identification code along the collation table.

The laser radar head section 7 judges whether the transmitted response code corresponds to the identification code, while referring to the collation table in the same way. Then, only when all the transmitted response codes correspond to the collation table, the normal operation of the laser light irradiation is performed. With this, there is no possibility that a correct response code is obtained accidentally and that laser light irradiation becomes possible. In addition, it can made difficult for a third person to analyze the response code.

As has been described, according to the present invention, the laser light irradiation of the output intensity of more than 1 class becomes possible only when the laser radar control section 8 connected to the laser radar head section 7 is a regular one and also when a self-vehicle meets a predetermined condition during traveling. As a result, there is no chance that the laser light of the output intensity of more than class 1 is irradiated to the human body for a long period of time, whereby safety can be ensured.

Although the present invention has been fully described by way of the preferred embodiments thereof with reference to the accompanying drawings, various changes and modifications will be apparent to those having skill in this field.

What is claimed is:

1. A laser radar apparatus comprising:
    a laser radar head section for irradiating laser light toward an object of detection and for measuring a distance to said object based on the period of time from a first time point at which the laser light is irradiated to a second time point at which the laser light reflected by said object of detection returns;
    a laser radar control section connected with said laser radar head section for controlling the operation thereof based on the result of the distance measurement; and
    identification means provided on said laser radar head section for identifying that said laser radar control section is a regular laser radar section control.

2. A laser radar apparatus comprising:
    a laser radar head section for irradiating laser light toward an object of detection and for measuring a distance to said object based on the period of time from a first time point at which the laser light is irradiated to a second time point at which the laser light reflected by said object of detection returns;
    identification means provided on said laser radar head section for transmitting an identification code;
    a laser radar control section connected with said laser radar head section for controlling the operation thereof based on the result of the distance measurement; and
    response-code transmission means provided on said laser radar control section for receiving said identification code from said identification means and transmitting a response code corresponding to said identification code;
    wherein said identification means enables laser irradiation of said laser radar head section when it receives said response code corresponding to said identification code transmitted therefrom.

3. The laser radar apparatus as set forth in claim 2, wherein said identification means repeatedly transmits said identification code when it does not receive a correct response code.

4. The laser radar apparatus as set forth in claim 2, wherein said laser head transmits laser light whose intensity is harmless to the human body when it does not receive a correct response code.

5. The laser radar apparatus as set forth in claim 2, wherein said identification means prevents a laser irradiation operation when it does not receive said response code even after transmission of said identification code a predetermined number of times.

6. The laser radar apparatus as set forth in claim 1, wherein said identification means identifies said laser radar control section only at the time of the starting of said apparatus.

7. The laser radar apparatus as set forth in claim 1, wherein said identification means identifies said laser radar control section at intervals of a predetermined time after said apparatus has been started.

8. The laser radar apparatus as set forth in claim 7, wherein said identification means identifies said laser radar control section at intervals of a predetermined time and at the same time performs the distance measurement processing.

9. The laser radar apparatus as set forth in claim 2, wherein said response-code generation means performs, upon receipt of said identification code, a predetermined operational processing onto said identification code to generate a response code which is known to said identification means.

10. The laser radar apparatus as set forth in claim 2, wherein said response-code transmission means transmits a response code characteristic to said apparatus upon receipt of said identification code.

11. The laser radar apparatus as set forth in claim 9, wherein said identification means generates a random number, performs an operational processing onto the generated random number, and transmits the thus processed random number to said response-code generation means of said laser radar control section as an identification code, and wherein said response-code generation means performs said operational processing to the received identification code and then transmits the processed code to said identification means as a response code.

12. The laser radar apparatus as set forth in claim 2, wherein said identification means transmits an identification code characteristic to said apparatus to said laser radar control section and receives a response code corresponding to said identification code from said laser radar control section.

13. The laser radar apparatus as set forth in claim 2, wherein said identification means and said laser radar control section are each provided with a collation table of identification and response codes; said laser radar control section receives said identification code and then transmits a response code corresponding to said identification code, while referring to said collation table; and said identification means judges whether the received response code is a regular one, while referring to said collation table.

14. The laser radar apparatus as set forth in claim 12, wherein said identification means transmits different kinds of identification codes to said laser radar control section a plurality of times in accordance with said collation table, and judges, from an error rate of the response codes responded with respect to these identification codes, whether the laser radar control section is a regular one.

15. The laser radar apparatus as set forth in claim 2, wherein said identification means generates a warning when an illegal response code is received, in order to prevent analysis of the response code corresponding to the identification code.

16. The laser radar apparatus as set forth in claim 15, wherein, said identification means disables, upon receipt of said illegal response code, said laser radar head section which cannot be released by users.

* * * * *